(12) United States Patent
Payne et al.

(10) Patent No.: US 7,973,673 B2
(45) Date of Patent: Jul. 5, 2011

(54) AUTOMATED METER READER DIRECT MOUNT ENDPOINT MODULE

(75) Inventors: Robert Kent Payne, Waseca, MN (US); Wayne Andrew Lien, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 1128 days.

(21) Appl. No.: 11/695,503

(22) Filed: Apr. 2, 2007

(65) Prior Publication Data

US 2008/0238711 A1  Oct. 2, 2008

(51) Int. Cl.
G08B 23/00 (2006.01)
(52) U.S. Cl. ............... 340/870.02; 324/74; 324/156; 361/600; 361/659
(58) Field of Classification Search .......... 340/870.02–870.03; 361/600, 361/659; 324/74, 156
See application file for complete search history.

(56) References Cited

U.S. PATENT DOCUMENTS

| | | |
|---|---|---|
| 3,425,275 A | 2/1969 | Russell, Jr. et al. |
| 3,793,563 A | 2/1974 | Brefka |
| 3,893,586 A | 7/1975 | De rose et al. |
| 3,909,908 A | 10/1975 | Brefka |
| 3,931,992 A | 1/1976 | Coel |
| 4,092,698 A | 5/1978 | Brefka |
| 4,463,354 A | 7/1984 | Sears |
| 4,640,985 A | 2/1987 | Martin et al. |
| 4,786,903 A | 11/1988 | Grindahl |
| 4,811,600 A | 3/1989 | Robitaille |
| 4,851,803 A | 7/1989 | Hahn |
| 4,859,944 A | 8/1989 | Webb |
| 4,977,368 A | 12/1990 | Munday et al. |
| 5,001,420 A | 3/1991 | Germer et al. |
| 5,027,056 A | 6/1991 | Russillo |
| 5,027,061 A | 6/1991 | Palmer et al. |
| 5,049,810 A | 9/1991 | Kirby et al. |
| 5,057,767 A | 10/1991 | Keturakis et al. |
| 5,066,906 A | 11/1991 | Moore |
| 5,088,004 A | 2/1992 | Howell |
| 5,107,203 A | 4/1992 | Timko |

(Continued)

FOREIGN PATENT DOCUMENTS

WO    WO 2004/085973    10/2004

OTHER PUBLICATIONS

Arun Sehgal; AMR Offers Multiple Benefits; PipeLine and Gas Technology; Apr./May 2005; © Hart Energy Publishing; (3 pages).

(Continued)

*Primary Examiner* — Albert K Wong
(74) *Attorney, Agent, or Firm* — Dority & Manning, P.A.

(57) ABSTRACT

An automated meter reader module can be operably connected to an existing utility meter to provide an endpoint for use in an automated meter reader system. The automated meter reader module can utilize an index attachment drive mechanism to electronically and mechanically monitor consumption of a utility such as water, gas, or electricity. The index attachment of the existing utility meter is attached so that it does not physically impede reception or transmission of radio frequency communications by a patch antenna integrated into a printed circuit board located inside the automated meter reader module. A gasket around the edge of the housing sealingly interfaces with the existing utility meter and a multi-faced cover that allows the registered dials located on the index attached to be viewed from a plurality of vantage points.

8 Claims, 12 Drawing Sheets

U.S. PATENT DOCUMENTS

| | | | |
|---|---|---|---|
| 5,120,252 A | 6/1992 | Mayo et al. |
| 5,134,544 A | 7/1992 | Howell |
| 5,181,166 A | 1/1993 | Howell |
| 5,196,783 A | 3/1993 | Howell |
| 5,270,639 A | 12/1993 | Moore |
| 5,339,686 A | 8/1994 | DeJarlais et al. |
| 5,343,143 A | 8/1994 | Voisine |
| 5,364,290 A | 11/1994 | Hartman |
| 5,416,475 A | 5/1995 | Tolbert et al. |
| 5,421,201 A | 6/1995 | Pellerin, Jr. |
| 5,473,504 A | 12/1995 | Horan et al. |
| 5,486,755 A | 1/1996 | Horan et al. |
| 5,495,239 A | 2/1996 | Ouellette et al. |
| 5,514,959 A | 5/1996 | Horan et al. |
| 5,564,470 A | 10/1996 | Denmark et al. |
| 5,767,790 A | 6/1998 | Joveliana |
| 5,777,222 A | 7/1998 | Roberts |
| 5,825,303 A | 10/1998 | Bloss, Jr. et al. |
| 5,926,014 A | 7/1999 | Tiemann |
| 6,054,780 A | 4/2000 | Haigh et al. |
| 6,084,395 A | 7/2000 | Thiel |
| 6,100,816 A | 8/2000 | Moore |
| 6,100,817 A | 8/2000 | Mason, Jr. et al. |
| 6,111,519 A | 8/2000 | Bloss, Jr. et al. |
| 6,162,082 A | 12/2000 | Karsten et al. |
| 6,177,884 B1 | 1/2001 | Hunt et al. |
| 6,218,995 B1 | 4/2001 | Higgins et al. |
| 6,411,219 B1 | 6/2002 | Slater |
| 6,414,605 B1 | 7/2002 | Walden et al. |
| 6,426,027 B1 | 7/2002 | Scarborough, III |
| 6,522,124 B1 | 2/2003 | Ballard |
| 6,528,986 B2 | 3/2003 | Ballard |
| 6,617,976 B2 | 9/2003 | Walden et al. |
| RE38,348 E | 12/2003 | Bloss et al. |
| 6,756,914 B1 | 6/2004 | Fitzgerald et al. |
| 6,773,652 B2 | 8/2004 | Loy et al. |
| 6,797,884 B2 | 9/2004 | Kubota |
| 6,816,360 B2 | 11/2004 | Brooksby et al. |
| 6,885,185 B1 | 4/2005 | Makinson et al. |
| 6,891,104 B2 | 5/2005 | Dinh |
| 6,903,699 B2 | 6/2005 | Porter et al. |
| 6,982,651 B2 * | 1/2006 | Fischer .................... 340/870.02 |
| 7,033,193 B2 | 4/2006 | Higgins et al. |
| 7,059,200 B2 | 6/2006 | Sallee |
| 7,283,063 B2 | 10/2007 | Salser, Jr. |
| 2002/0163442 A1 | 11/2002 | Fischer |
| 2002/0193144 A1 | 12/2002 | Belski et al. |
| 2003/0089298 A1 | 5/2003 | Holowick |
| 2003/0151886 A1 | 8/2003 | Buhl |
| 2006/0218104 A1 | 9/2006 | Johnson et al. |

OTHER PUBLICATIONS

Itron; 40GB ERT Module; Funtionality Profile; Oct. 2006; (4 pages).

* cited by examiner

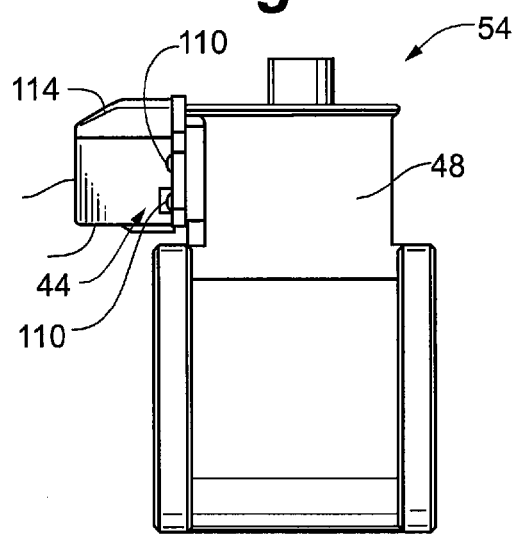
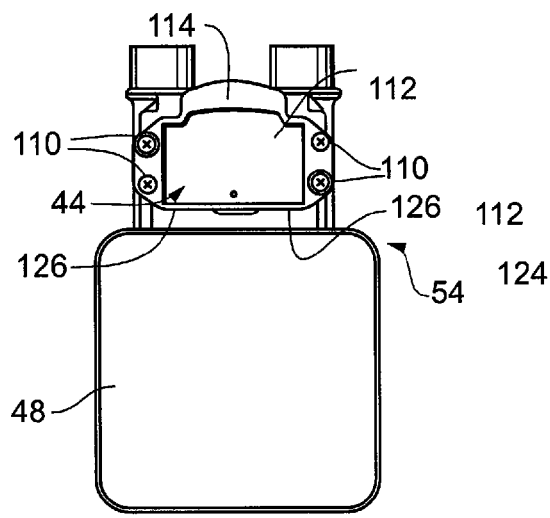
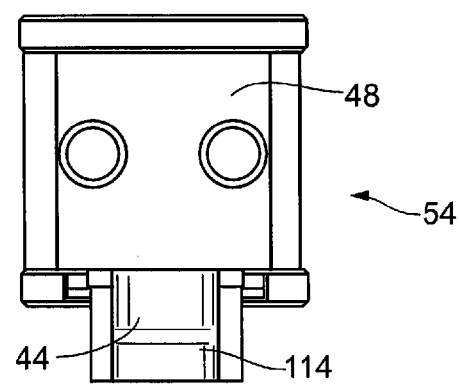

AUTOMATED METER READER DIRECT MOUNT ENDPOINT MODULE

FIELD OF THE INVENTION

The present invention relates generally to utility meters. More specifically, the present invention relates to data collection endpoint devices that operably connect to utility meters as part of an automated meter reader system.

BACKGROUND OF THE INVENTION

Utility companies typically measure consumption data by reading meters located at a service point, or endpoint, on customers' properties. To determine monthly natural gas consumption, for example, the numerical difference between a meter reader at the start of a month and at the end of the month reveals the amount of natural gas consumed. Utility companies can similarly measure customers' consumption of water and electricity. Using this information, utility companies are then able to bill customers based upon a price per unit of water, gas, or electricity. Information derived from meter readers can also assist utility companies in mapping seasonal and daily consumption habits of their customers.

Traditionally, utility companies have obtained consumption information by individually visiting customers' properties to physically read meters. Since the frequency of meter readers typically mirrors billing cycles, utility company commonly need to revisit the same meter on a monthly or semi-annual basis to obtain consumption information. In the United States alone, the annual cost to utility companies of reading water, gas, and electric meters is approximately $3 billion dollars. Much of this cost is the result of the cost of hiring individuals to visit customers' properties to obtain meter readings. As the population grows, individuals move to geographically remote locations, and the cost of wages rises, the amount utilities companies spend on individual meter readers is expected to climb.

Utility meter systems that require manual readings of consumption data represent a significant contributor to these rising costs and are marked by a number of other disadvantages. These disadvantages include a high incidence of reader error, exposure of individuals who read meters to safety hazards, the ease with which consumer can tamper with a meter reader, an inability to detect meter tampering, difficulty of obtaining consumption data at odd or inconvenient hours of the day, and an inaccessibility of meter readers due to dangerous dogs, locked gates, or angry customers.

To avoid some or all of the problems associated with manually obtaining meter readers, utilities companies have begun implementing automated meter reader (AMR) systems, also referred to as remote meter reader systems. Generally, AMR systems reduce or eliminate the need to visually inspect individual utility meters to obtain consumption data. This gives utility companies an opportunity to realize long-term cost savings, improve operational efficiencies, provide estimated bills that are more accurate, and build a meter-reading infrastructure adaptable to the companies' evolving needs.

In operation, AMR systems utilize an endpoint to communicate a signal representative of a utility meter reader to a remote reading device or network. Consumption data can then be incorporated into a data-collection system. Communication between the AMR endpoint and remote reading device is normally accomplished by radio frequency (RF). For example, most traditional meter endpoints employ a reading module that uses the utility being consumed, such as fluid flow or watt-hours, to power an internal drive system operably connected to a register dial on an index attachment. As a utility is consumed, rotations of an internal drive shaft change the readings of the register dials. In some AMR systems, a small module can be mounted on the face of the existing meter reader such that the rotations of the internal drive shaft cause an electronic signal to be produced. As described in U.S. Patent Application No. 2003/0151886 by Buhl, an AMR-compatible meter reader module may include interfaces on opposite sides of a meter reader module drive shaft for rotationally communicating with and between the register index and the meter. The intercepted rotations may then be transmitted by a transmitter to various remote reading devices or networks by RF communication.

One of the biggest challenges a utility company faces in implementing an AMR system is converting traditional mechanically read meter endpoints into AMR meter endpoints. In particular, the cost of implementing AMR technology can be great since a utility company must individually set up AMR-compatible meter endpoints for each customer. Since a total replacement of a traditional meter endpoint may be costly, dangerous, and unnecessarily interrupt a customer's utility service, AMR endpoints have been designed to substantially preserve and, in fact, utilize the structure and functionality of existing utility meters.

Since several years are typically required for a utility company's reduced meter reading expenses to cover the costs of installing and implementing an AMR system, frequent repair or replacement of endpoint can reduce or negate the cost-saving benefit of an AMR system. Therefore, there is a need for low-cost automated meter reader modules that can be installed quickly and easily, resist degradation due to environmental conditions and use, and can be used in multiple methods of data collection.

SUMMARY OF THE INVENTION

The present invention meets the aforementioned needs of the industry, in particular by providing an automated meter reader (AMR) direct mount endpoint module. The AMR module can be mounted onto an existing utility meter so as to utilize the utility meter's index and meter drive mechanisms to electronically and visually monitor consumption of a utility such as water, gas, or electricity. The AMR module may be compatible with the index attachment previously used to read the existing utility meter such that the AMR module is effectively mounted between the meter drive mechanisms of the meter and the index attachment that displays readings associated with the meter. The AMR module in accordance with various embodiments of the present invention has a patch antenna that is arranged to provide better transmission and reception of RF signals and the components of the AMR module are protected within an environmentally rugged enclosure that can be operably connected to the meter while the meter is in operation and can be removed from and remounted without the need of a new sealing member.

The AMR module will generally include a housing portion. The housing comprises several walls that form at least one housing cavity. The number and location of theses walls can be changed according to different embodiments to form various sub-cavities of different size and shape within the main housing cavity. A housing main cavity may contain, for example, a battery, a printed circuit board, or other components associated with the automated meter reader systems. The housing portion also comprises a generally planar base adapted to be mounted onto the existing utility meter.

The AMR module will also generally include a cover or enclosure. The cover, which can also be secured to the existing utility meter in some embodiment, is positioned relative to the housing so that it covers both the housing cavity and an index attachment secured to a pair of mounting posts on the meter. In one embodiment, the cover has several transparent faces through which register dials or displays on the index attachment can be viewed. In one embodiment, a substantially planar front surface and a curved upper surface, for example, may permit a viewer to read dials located on the index attach from various vantage points.

Exposing an AMR module to water and other environmental stresses will generally adversely affect the durability and long-term performance of the module and the automated meter reader system. To protect the electronic circuitry and other sensitive components housing in the AMR module, the module can be fitted with a gasket substantially impermeable to water. The gasket seals the interface of the base and the existing utility meter and the interface of the base and the cover. Normally, the gasket is attached to the main housing along the perimeter based. In one embodiment, the AMR module is provided with a sealing gasket that is releasable and resealable. In another embodiment, the cover of the AMR module is canted at a slightly outwardly downward angle relative to the base and includes water drain apertures proximate a bottom outward-most portion of the cover. These water drain apertures are dimensioned to permit effective drainage of any water or condensation within the cover, while generally precluding access to the interior of the cover by insects, for example.

To operate as part of an automated meter reader system, an endpoint that is part of the AMR module will generally include a printed circuit board. The printed circuit board may have or be in communication with an encoder, a receiver, and a transmitter. The printed circuit board is typically located within the housing cavity. In one embodiment, the printed circuit board is stabilized by a pair of biasing members attached to the printed circuit board. The biasing members force the printed circuit board against portions of the walls forming the housing cavity, thereby substantially securing the printed circuit board in place. Potting material can also be added to the main housing cavity to stabilize and further protect the printed circuit board.

In one embodiment, the receiving and transmitting functions of the automated meter reader direct mount endpoint module are generally performed by a patch antenna. In an example embodiment, the automated meter read direct mount endpoint module comprises a patch antenna integrated into a printed circuit board. The patch antenna will typically be located at or near one end of the printed circuit board. The printed circuit board is typically located within a main housing cavity and secured at least partially between the base and the index attachment. The patch antenna, however, occupies a portion of the housing cavity extending beyond the perimeter of the area of the existing utility meter to which the automated meter reader module is attached. In this manner, physical interference by the index attachment and/or meter with radio frequency communications received by and transmitted from the patch antenna may be reduced.

In one embodiment, the encoding function of the endpoint of the AMR module is generally performed by a wriggler in communication with a switch located on the printed circuit board. The wriggler has a meter interface mechanism adapted to matingly engage a rotating meter interface of the existing utility meter and an index interface mechanism adapted to matingly engage an index interface of the index attachment. In one embodiment, the wriggler and interfaces are arranged to permit installation of the AMR module while the meter is operating by the design of the mating interface on the wriggler to permit mating while the wriggler is in an initial an oblique orientation which can then be transitioned to an axially aligned orientation for final mounting.

Although the present invention is generally described in relation to an automate meter reading system used to monitor gas consumption, the automated meter reader module can also be used in monitoring consumption of other utilities, such as gas and electricity, without departing from the spirit and scope of the present invention.

The above summary of the present invention is not intended to describe each embodiment or every implementation of the present invention. The figures and the detailed description that follow more particularly exemplify these embodiments.

BRIEF DESCRIPTION OF THE DRAWINGS

FIG. 4 is a side view of an automated meter reader endpoint having an automated meter reader module according to an embodiment of the present invention.

FIG. 5 is a front view of an automated meter reader endpoint having an automated meter reader module according to an embodiment of the present invention.

FIG. 6 is a top view of an automated meter reader endpoint having an automated meter reader module according to an embodiment of the present invention.

DETAILED DESCRIPTION

Figure 1:
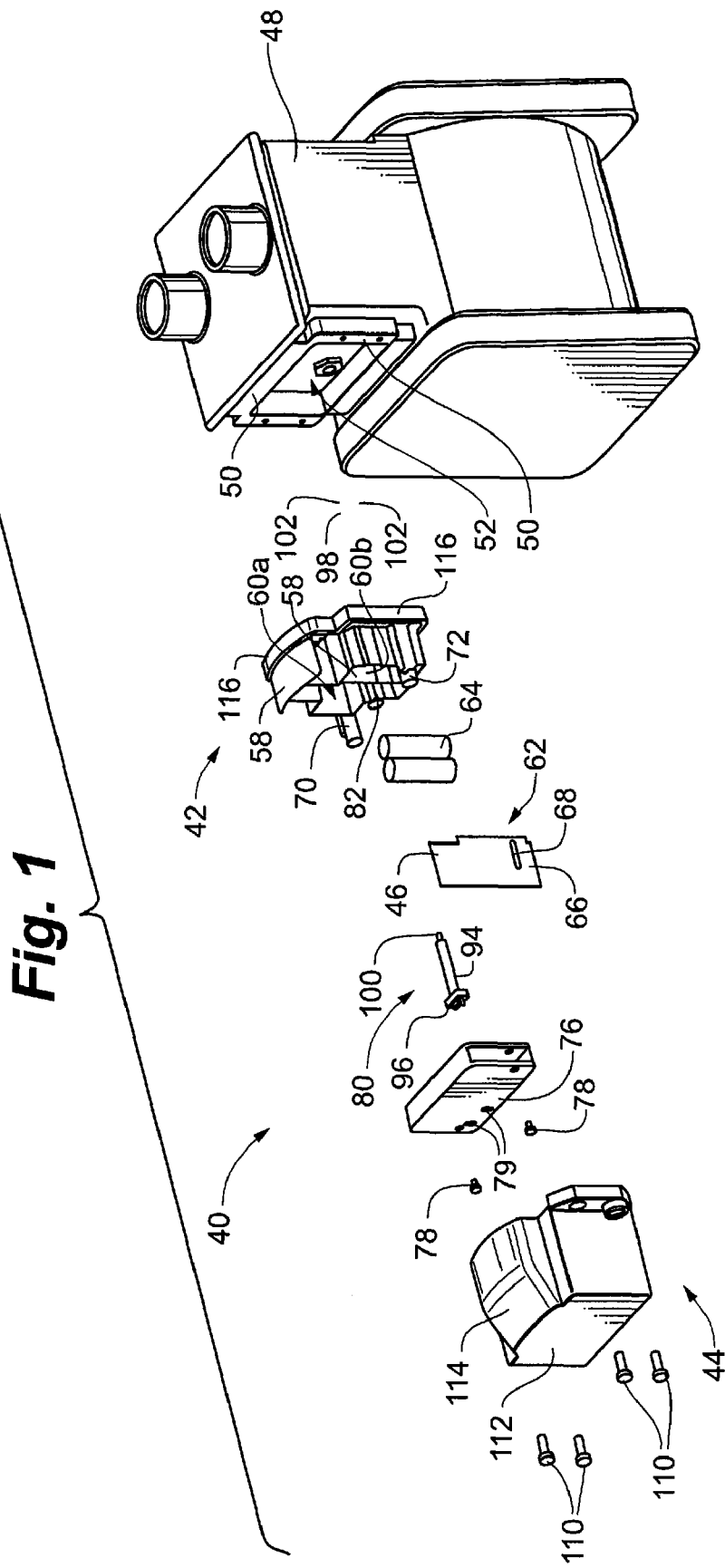
FIG. 1 is an exploded perspective view of an automated meter reader module as the automated meter reader module would be attached to and a utility meter.

The invention can be more readily understood by reference to FIGS. 1-29 and the following description. While the invention is not necessarily limited to such an application, the invention will be better appreciated using a discussion of example embodiments in such a specific context.

Referring to FIGS. 1-6, automated meter reader module 40 comprises a housing 42, a cover 44, and a patch antenna 46, in an example embodiment. Referring to FIGS. 1, and 4-6, automated meter reader module 40 is attached to utility meter 48 on mounting structure 50 at attachment area 52 to form automated meter reader endpoint 54.

Figure 2:
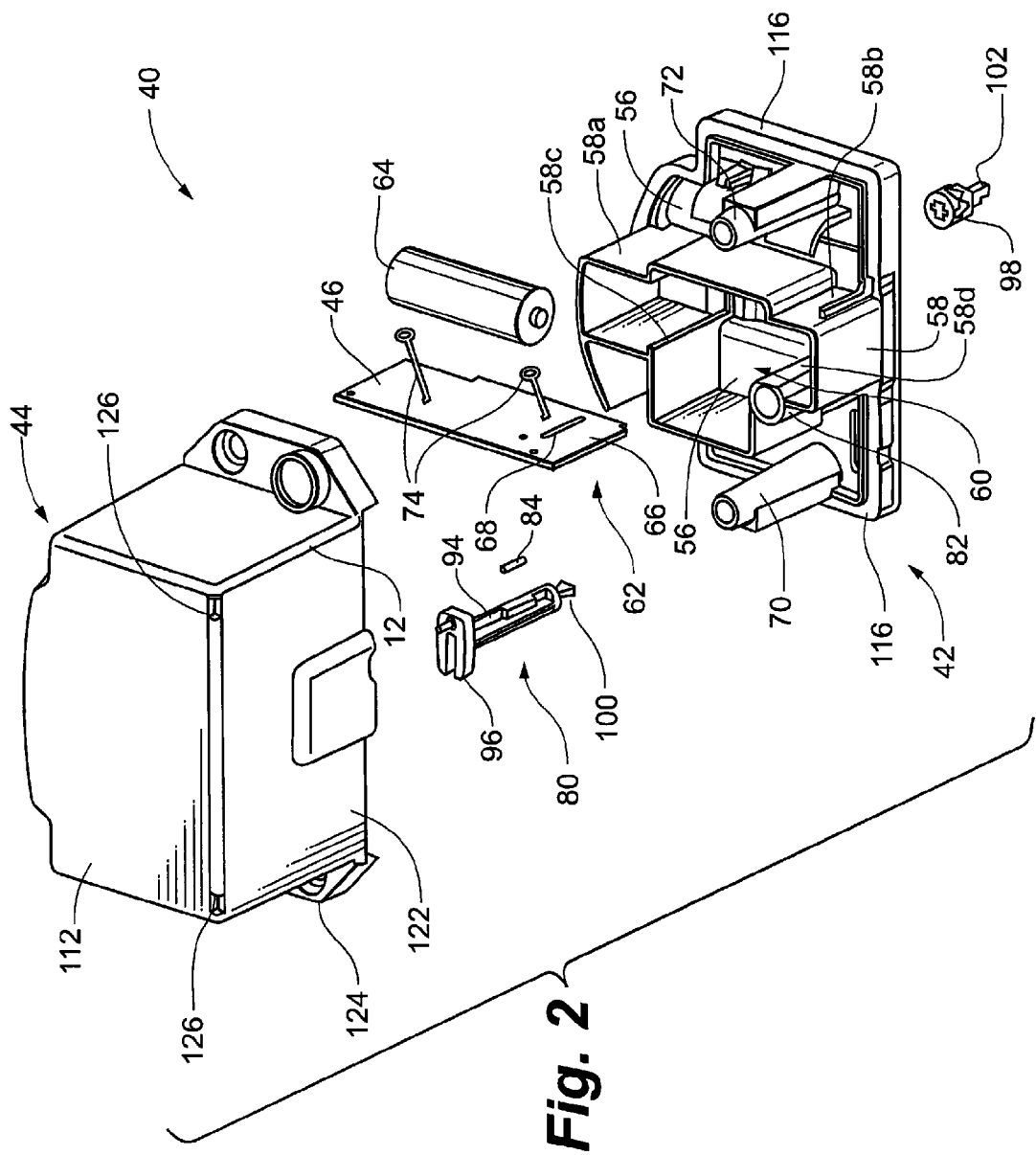
FIG. 2 is an exploded perspective view of an automated meter reader module according to an embodiment of the present invention.
Figure 3:
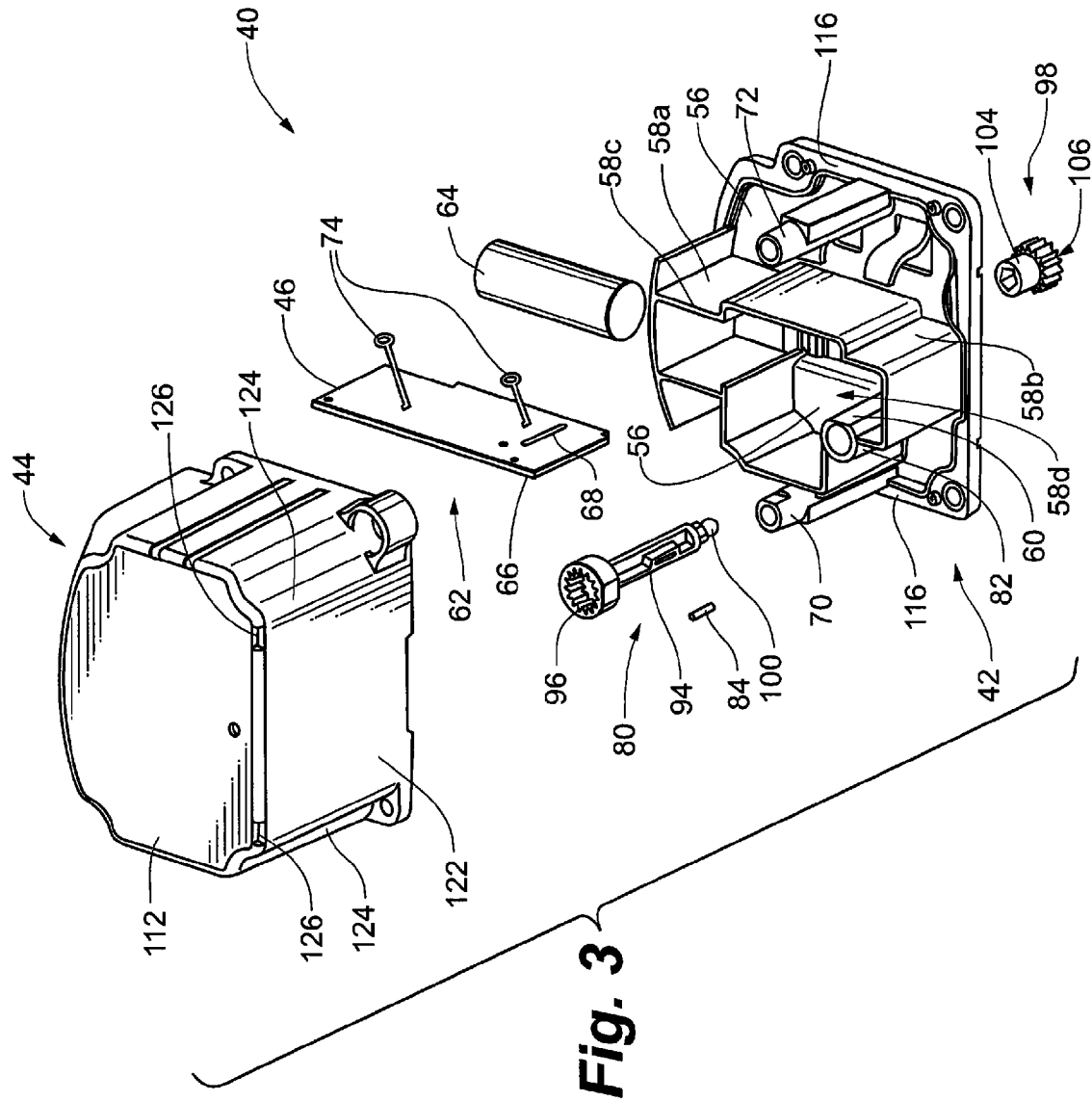
FIG. 3 is an exploded perspective view of an automated meter reader module according to an embodiment of the present invention.

Housing 42 has a substantially planar base 56. On the front side of base 56, as depicted in FIGS. 1-3, base 56 has a plurality of walls 58. Walls 56 define housing cavity 60. Depending upon how walls 58 are configured, walls 58 may define a plurality of housing cavities 60. In an example embodiment, walls 58 define at least two housing sub-cavities 60a, 60b. As depicted in FIG. 1, base 56 and walls 58 can be configured so housing sub-cavities 60a, 60b receive printed circuit board 62 and battery 64. Printed circuit board 62 generally comprises patch antenna 46 and electronic circuitry 66. In an example embodiment, patch antenna 46 is integrated into printed circuit board 62. In other embodiments, an antenna may be separate from electronic circuitry 66. In one embodiment, patch antenna 46 generally comprises a printed circuit foil pattern with several standard impedance matching components. Electronic circuitry 66 generally comprises switch 68 that generates and/or receives an electronic signal corresponding to radio frequency communications transmitted or received by the antenna.

Printed circuit board 62 can be positioned in housing sub-cavity 60a in any number of ways. In one embodiment, relative to automated meter reader module 40 that is installed on utility meter 48, printed circuit board 62 is positioned vertically in housing 42 between left-hand mounting post 70 and right-hand mounting post 72, as depicted in FIGS. 1-3. In an example embodiment, printed circuit board 62 is vertically oriented such that patch antenna 46 is above electronic circuitry 66 in an installed automated reader meter module 40. In this embodiment, patch antenna 46 occupies a portion of sub-cavity 60a that extends beyond the perimeter of attachment area 52 of utility meter 48, as depicted in FIG. 1.

In general, printed circuit board 62 and battery 64 should be fixedly secured within housing cavity 60. Although in some instances maintenance may require printed circuit board 62 and battery 64 to be removed, it is anticipated that printed circuit board 62 and battery 64 will remain in place for approximately the life of battery 64, such as, for example, around twenty years. This is typically accomplished by potting or filling one or more housing cavities with a potting material.

To maintain the position of patch antenna 46, as well as electronic circuitry 66, in appropriate position prior to and during the potting of the printed circuit board 62, in one embodiment, printed circuit board 62 comprises at least one biasing member as depicted in FIGS. 2-3. Biasing member 74 may be any resiliently compressible component attachable to a side of printed circuit board 62. In an example embodiment, printed circuit board comprises two biasing members 74 having an elongated body and a resiliently compressible annular end distal to the elongated body. The biasing members 74 are typically located near opposite ends of one side of printed circuit board 62.

In operation, biasing members 74 exert a force against a portion of walls 58 and thereby push printed circuit board 62 against an opposite portion of walls 58. Referring to FIGS. 2-3, base 42 and walls 58 are generally configured so that biasing members 74 extending from a surface of printed circuit board 62 contact a portion of walls 58a, 58b. Opposite surface of printed circuit board 62 contacts an opposite portion of walls 58c, 58d. As depicted in FIGS. 2-3, the opposite portion of walls 58c, 58d may comprises an edge or edges that partially extend beyond a plane formed by walls 58. When printed circuit board 62 is placed in housing cavity 60, the resiliently compressible ends of biasing member 74 exert a force against a portion of walls 60a, 60b. In response this portion of walls 60a, 60b exerts an opposing force against printed circuit board 62 that causes printed circuit board 62 to forcibly contact an opposite portion of walls 60c, 60d. Printed circuit board 62 is thereby releasably secured between walls 60 of housing 42 defining housing cavity 60. In this embodiment, the biasing members 74 provide a mechanism for releasably securing printed circuit board 62 in position during the manufacturing process such that printed circuit board 62 can be conveniently installed and also, if needed, removed and reinstalled, prior to potting the AMR module.

In one embodiment, index attachment can be secured to left-hand and right-hand mounting posts 70, 72. As depicted in FIG. 1, left-hand and right-hand mounting posts 70, 72, extending from base 42 are interfaced with index attachment 76. In an example embodiment, left-hand and right-hand mounting posts 70, 72 are specifically adapted to interface with index attachment 76 originally mounted to and subsequently removed from utility meter 48. Referring to FIG. 1, index fastening members 78 are inserted through index attachment 76 and secured to left-hand and right-hand mounting posts 70, 72. Typically, left-hand and right-hand mounting posts 70, 72 are adapted to receive index fasteners members 78 originally used to secure index attachment 76 to mounting structure 50 of utility meter 48. Although automated reader module 49 typically utilizes index attachment 76 and index fastening members 78 originally installed on existing utility meter 48, new index attachment 76 and new index fastening members 78 could easily be attached to left-hand and right-hand mounting posts 70, 72 during the process of manufacturing and assembling automated meter reader module 40.

Figure 7:
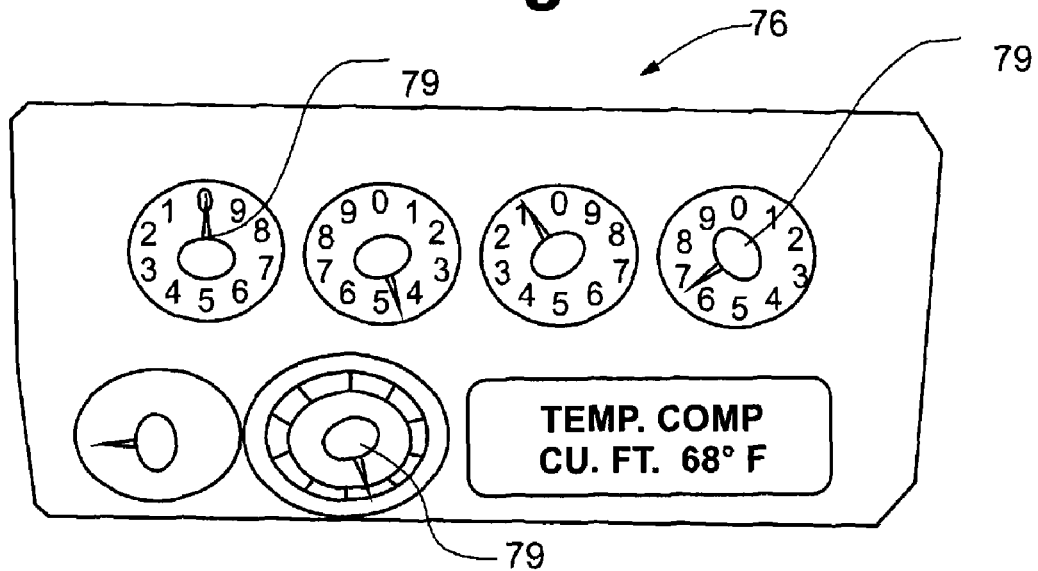
FIG. 7 is an illustration of an index attachment having register dials.
Figure 8:
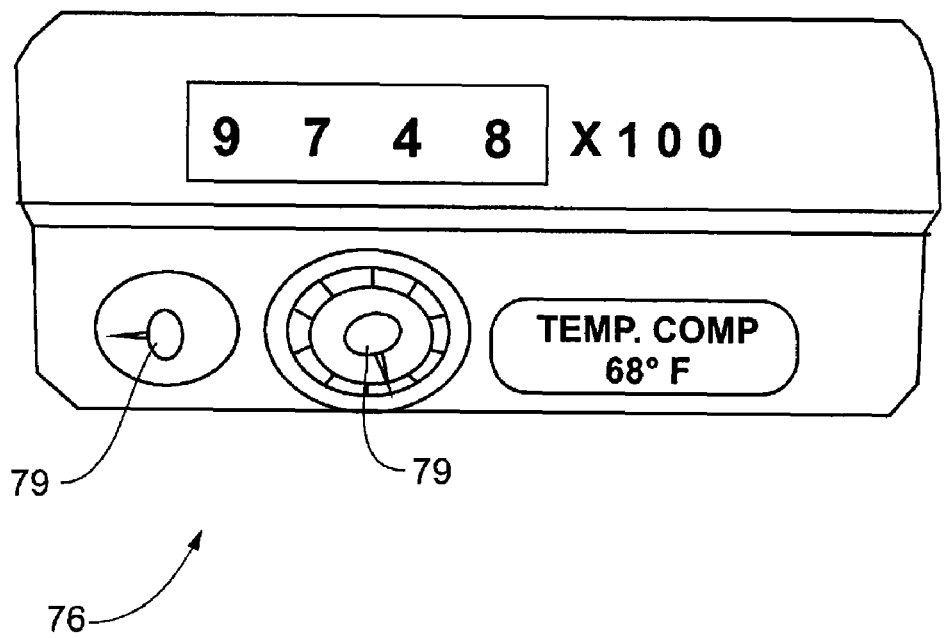
FIG. 8 is an illustration of an index attachment having register dials.

The arrangement of left-hand and right-hand mounting posts 70, 72 can be arranged in any number of ways to determine the placement of index attachment 76 in automated reader meter module 40. An attachment 76 having register dials 79, is depicted in FIGS. 7-8. Generally, left-hand and right-hand mounting posts 70, 72 are aligned horizontally on base 56 in relation to an automated reader module 40 attached to utility meter 48, as depicted in FIGS. 1-3. In an example embodiment, left-hand and right-hand mounting posts 70, 72 are horizontally aligned near bottom of base 56 such that index attachment 76 is situated below a portion of sub-cavity 60a that extends beyond the perimeter of attachment area 52 of utility meter 48. As previously noted, in one embodiment patch antenna 46 occupies the portion of sub-cavity 60a that extends beyond the perimeter of attachment area 52. In this way, patch antenna 46 extends above index attachment 76 relative to automated meter reader module 40 mounted to mounting structure 50 at attachment area 52 of utility meter 48. By utilizing patch antenna 46 that extends above index attachment 76, automated reader module 40 can provide an improved radio frequency transmission pattern and improved reception of radio frequency transmissions.

In one embodiment, the AMR module includes a wriggler 80 is located within wriggler housing 82. Wriggler housing 82 may be separate from or integrated into walls 58. Generally, wriggler housing 82 is integrated into walls 58, as depicted in FIGS. 1-3. When wriggler housing 82 is integrated into walls 58, wriggler 80 can be brought into closer proximity to switch 68 in electronic circuitry 66. Close proximity between wriggler 80 and printed circuit board 62 is advantageous because wriggler 80 typically wirelessly communicates with switch 68 that translates rotations of a relatively small magnet 84 into electronic signals. The functionality of wriggler 80 is further described in U.S. Publication No. 2003/0151886 A1 Buhl, the disclosure of which is hereby incorporated by reference in its entirety.

Figure 9:
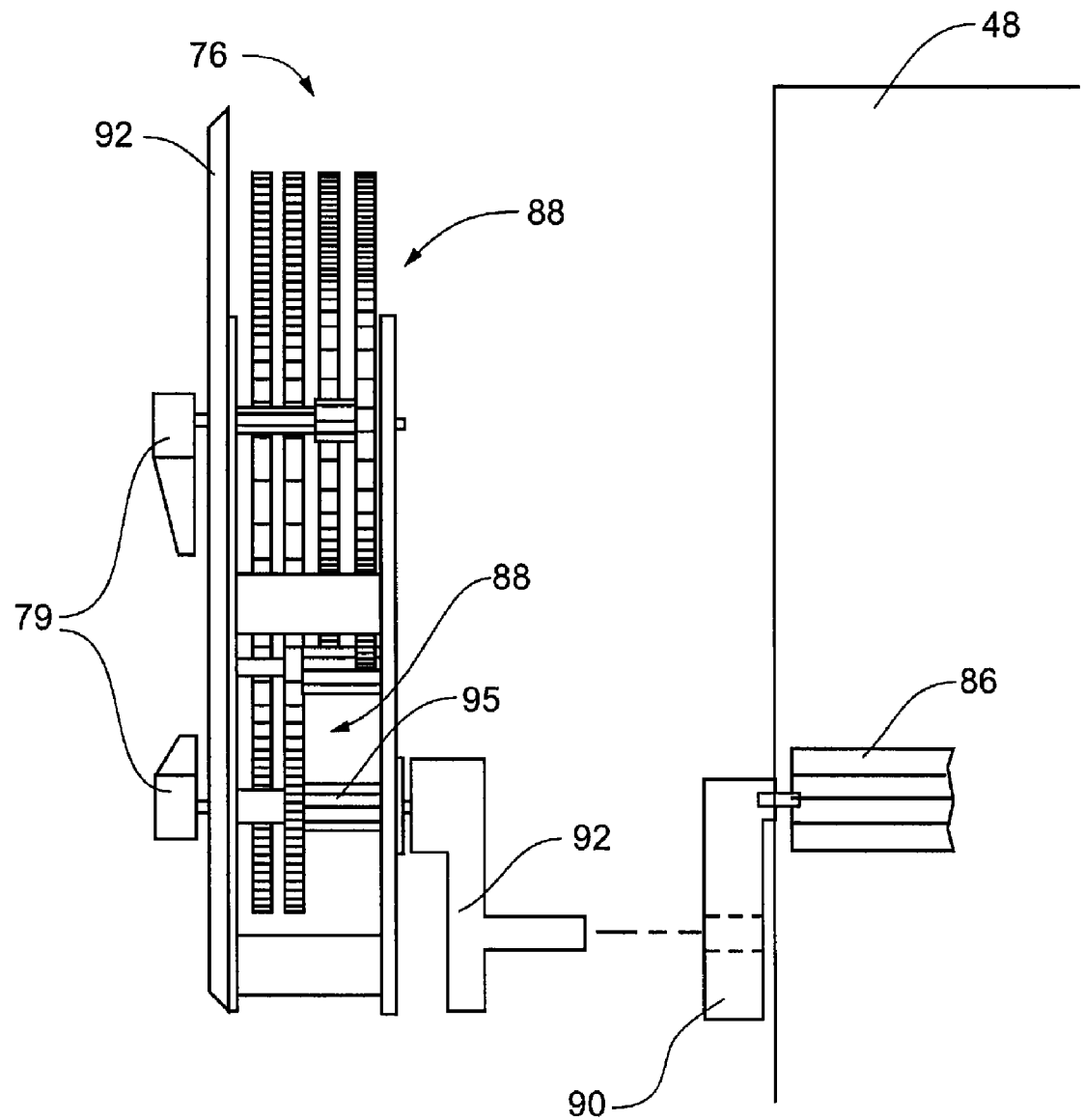
FIG. 9 is an illustration of the inter-connected gear mechanisms of an index attachment and a utility meter.

The rate at which wriggler 80 rotates is representative of the rate at which a utility such as gas, water, or electricity is consumed. Referring to FIG. 9, consumption of a utility by a consumer causes a gear mechanism in meter drive 86 of utility meter 48 to rotationally engage index gear system 88 in index attachment 76. Meter drive 86 in utility meter 48 has meter interface 90 that rotationally engages index interface 92 of index drive 94 in index attachment 76. As consumption of a utility causes meter interface 90 to rotate index interface 92, index gear system 88 in index interface 76 produce corresponding rotation of visible register dials 79 located on the outward-facing surface 92 of index attachment 76. When index attachment 76 is removed from utility meter 48 and attached to automated meter reader module 40, however, meter drive 86 is no longer able to act upon index drive 94 to produce visible rotations of register dials 79. Therefore, an important additional function of wriggler 80 is to provide an operable interface between meter drive 86 and index drive 94.

To provide an operable interface between meter drive 86 and index drive 94, wriggler 80 comprises label drive shaft 95, index interface mechanism 96, and meter interface mechanism 98. Meter interface mechanism 98 is designed to matingly engage meter interface 98. Similarly, index interface mechanism 98 is designed to matingly engage index interface 98. Generally, shaft 94 and index interface mechanism 96 integrally form a separate component from meter interface mechanism 98. Lockable tip 100 on an end of drive shaft 95 distal to index interface mechanism 96 lockably secures meter interface mechanism 98 to drive shaft 94.

Wriggler 80 can be operably connected to meter interface 90 and index interface 92 in any order. Since consumption of a utility by a consumer can continue to rotationally drive meter interface 90 during installation, it may be preferable to operably connect wriggler 80 to index attachment 76 before operably connecting wriggler 80 to utility meter 48. By first attaching wriggler 80 to index attachment 76, meter drive 86 will not cause index interface 92 to rotate, which can interfere or complicate the installation procedure.

Although wriggler 80 can be attached to index attachment 76 in any manner that avoids the mating of a rotationally moving component to a rotationally stationary component, attaching wriggler 80 to utility meter 48 often requires index attachment mechanism 98 to matingly engage meter interface 90 while meter interface 90 is rotating. As previously noted, meter drive 86 will cause meter interface 90 to rotate if a consumer continues to use a utility. Since it can be inappropriate, impractical, or uneconomic to temporarily suspend service of a utility during installation, wriggler 80 must be operably connectable to utility meter 48 while meter interface is rotating 90. Specifically, a meter interface mechanism 98 must be adapted to matingly engage rotating meter interface 90. Depending upon the type of utility meter 48 receiving automated meter reader module 40, meter interface mechanism 98 may comprise different shapes and configures, as seen by a comparison of meter interface mechanism 98, depicted in FIG. 2 and FIG. 3.

Currently, an installer must carefully align meter interface mechanism 98 with meter interface 90 as meter interface 90 is rotating. Typically, this requires considerable guesswork and trial-and-error. In addition to requiring additional time for installation, current designs of meter interface mechanisms 98 often contribute to permanent binding of meter interface mechanism 98 to meter interface 90. Binding can cause inaccurate meter readers, damage automated meter reader module 40 and utility meter 48, cause utility leaks, result in irrevocable damage to meter drive 86 if and when automated meter reader module is removed or replaced, or a combination thereof.

In one embodiment of the present invention, automated meter reader module 40 has wriggler 80 with meter interface mechanism 98 that facilitates mating engagement with rotating meter interface 90 and reduces the likelihood of binding. In an example embodiment, meter interface mechanism 98 has two spaced-apart interface members 102 extending beyond locking tip 100 along an axis parallel to the axis of drive shaft 94. In another example embodiment, meter interface mechanism has elongated neck 104, toothed gear 106 with teeth extending along axes perpendicular the axis of drive shaft 94.

Figure 10:
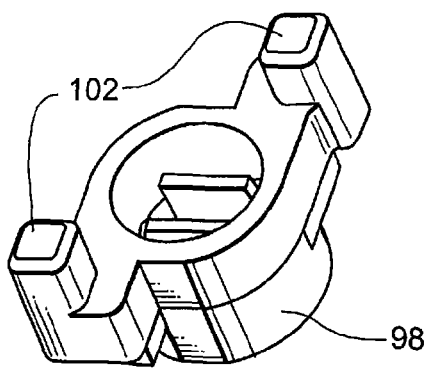
FIG. 10 is a perspective view of a meter interface mechanism according to an embodiment of the present invention.
Figure 11:
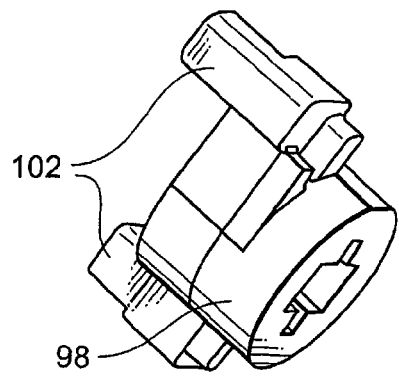
FIG. 11 is a perspective view of a meter interface mechanism according to an embodiment of the present invention.
Figure 12:
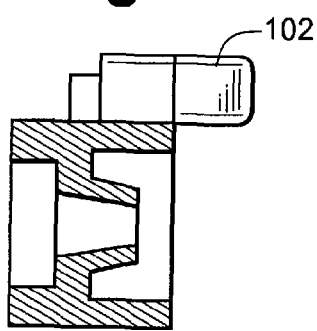
FIG. 12 is a cross-sectional side view of a cross section of a meter interface mechanism according to an embodiment of the present invention.
Figure 13:
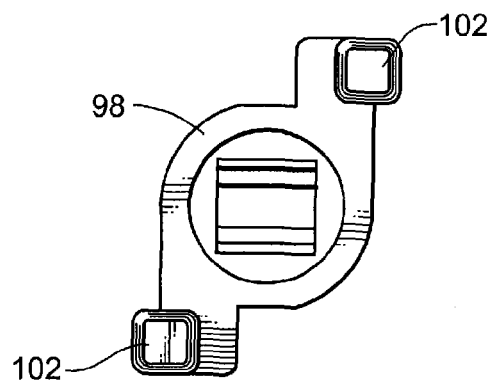
FIG. 13 is an elevational view of a side of a meter interface mechanism according to an embodiment of the present invention.
Figure 14:
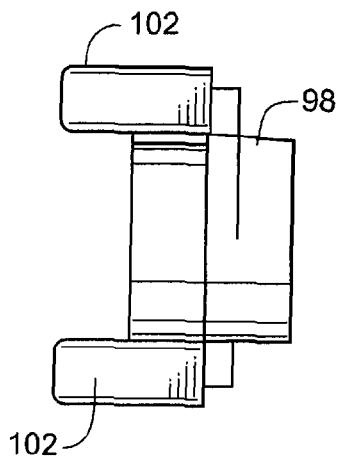
FIG. 14 is a side view of a meter interface mechanism according to an embodiment of the present invention.
Figure 15:
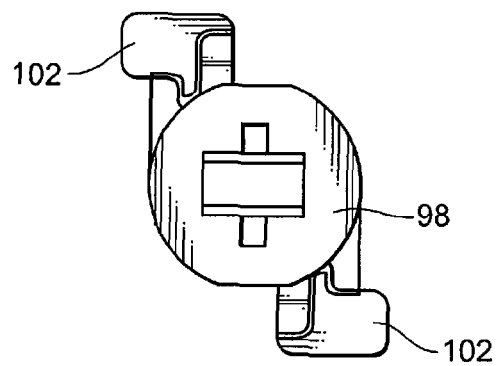
FIG. 15 is an elevational view of a side of a meter interface mechanism according to an embodiment of the present invention.

Referring to FIGS. 10-11, an example embodiment is depicted of meter interface mechanism 98 having two interface members 102. Interface members 102 are spaced approximately one-hundred eighty degrees apart. Interface members 102 can matingly engage meter interface 90 while meter interface 90 is rotating. Exemplary dimensions of meter interface mechanism 98 with interface members 102 are listed in FIGS. 12-15. One skilled in the art will recognize that changes may be made to the dimensions listed in FIGS. 12-15, as well as ratios of these dimensions, without departing from the spirit and scope of the present invention.

Figure 16:
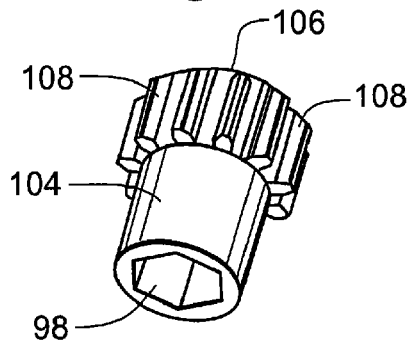
FIG. 16 is a perspective view of a meter interface mechanism according to an embodiment of the present invention.
Figure 17:
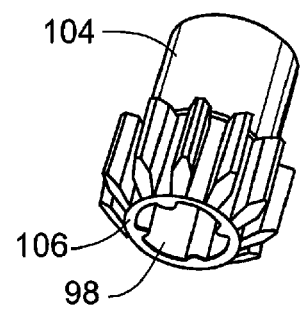
FIG. 17 is a perspective view of a meter interface mechanism according to an embodiment of the present invention.
Figure 18:
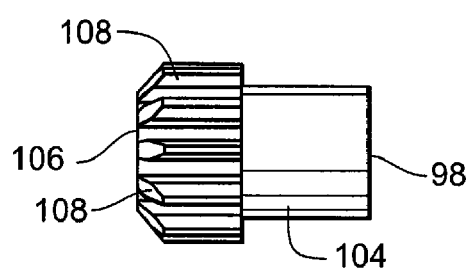
FIG. 18 is a side view of a meter interface mechanism according to an embodiment of the present invention.
Figure 19:
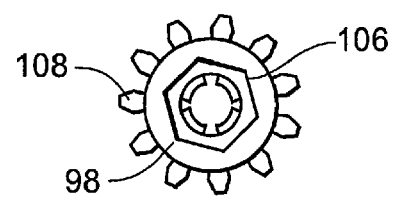
FIG. 19 is an elevational view of a side of a meter interface mechanism according to an embodiment of the present invention.
Figure 20:
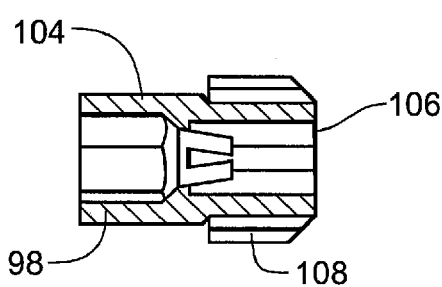
FIG. 20 is a cross-sectional side view of a meter interface mechanism according to an embodiment of the present invention.
Figure 21:
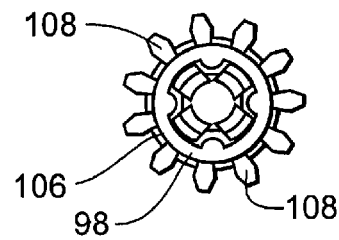
FIG. 21 is an elevational view of a meter interface mechanism according to an embodiment of the present invention.
Figure 22:
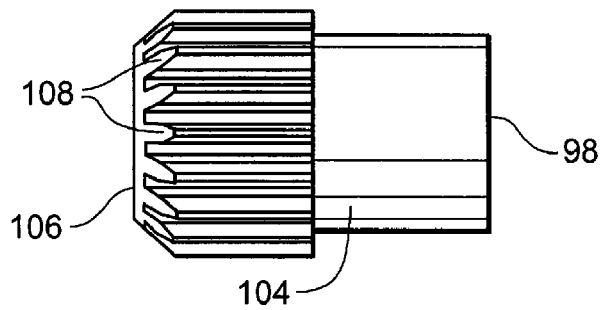
FIG. 22 is a side view of a meter interface mechanism according to an embodiment of the present invention.
Figure 23:
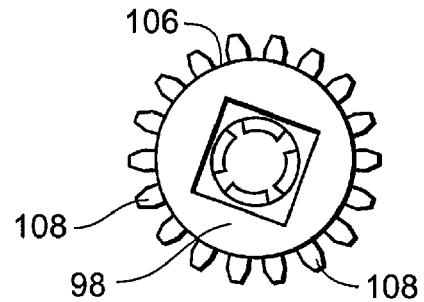
FIG. 23 is an elevational view of a meter interface mechanism according to an embodiment of the present invention.
Figure 24:
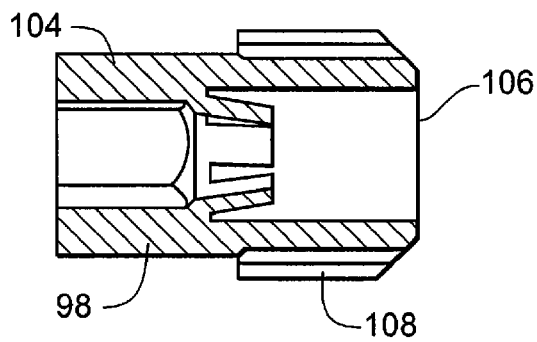
FIG. 24 is a cross-sectional side view of a meter interface mechanism according to an embodiment of the present invention.
Figure 25:
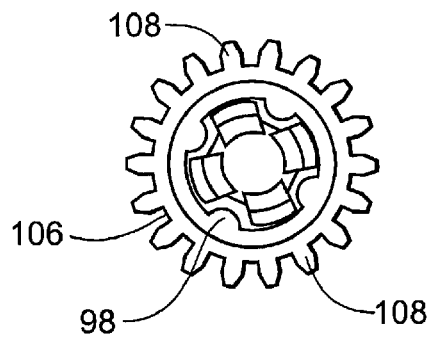
FIG. 25 is an elevational view of a meter interface mechanism according to an embodiment of the present invention.

Referring to FIGS. 16-17, an example embodiment is depicted of meter interface mechanism 98 having toothed gear 106 with beveled teeth 108. Beveled teeth 108 can matingly engage meter interface 90 while meter interface 90 is rotating. Beveled teeth 108 allow meter interface mechanism 98 to self-centering into and matingly engage meter interface 90. Meter interface mechanism 98 also has elongated neck 104. Elongated neck 104 can also facilitate operable connection of wriggler 80 to utility meter 48 by permitting an installer to observe whether toothed gear 106 has properly engaged meter interface 90. Exemplary dimensions of meter interface mechanism 98 with beveled teeth 108 and elongated neck 104 are listed in FIGS. 18-25. One skilled in the art will recognize that changes may be made to the dimensions listed in FIGS. 18-25, as well as ratios of these dimensions, without departing from the spirit and scope of the present invention.

When properly installed in accordance with one embodiment, wriggler 80 interfaces utility meter 48 and index attachment 76 such that consumption of a utility such as gas, electricity, or water causes meter drive 86 to rotate register dials 79 in the following manner: (i) meter drive 86 causes meter interface 90 to rotate; (ii) meter interface 90 causes meter interface mechanism 98 to rotate; (iii) meter interface mechanism 98 causes drive shaft 95 to rotate; (iv) drive shaft 95 causes index interface mechanism 96 to rotate; (v) index interface mechanism 96 causes index interface 92 to rotate; (vi) index interface 92 causes gears of index gear system 88 to rotate; and (vi) index gear system 88 causes register dials 79 to rotate.

To protect the functionality of automated reader meter module 40, cover 44 encloses housing 42, index attachment 76, printed circuit board 62, battery 64, wriggler 80, and other components. In an example embodiment, cover 44 is secured to mounting structure 50 of utility meter 98 with mounting fastening members 110. When attached to mounting structure 50, housing 42 is positioned between utility meter 48 and cover 44. Typically, cover 44 is adapted to receive mounting fastening members 110 originally used to previous endpoint cover to attachment area 52 of utility meter 48. Although automated reader module 40 typically utilizes mounting fastening members 110 originally installed on existing utility meter 48, new mounting fastening members 110 could easily be used as well.

Figure 26:
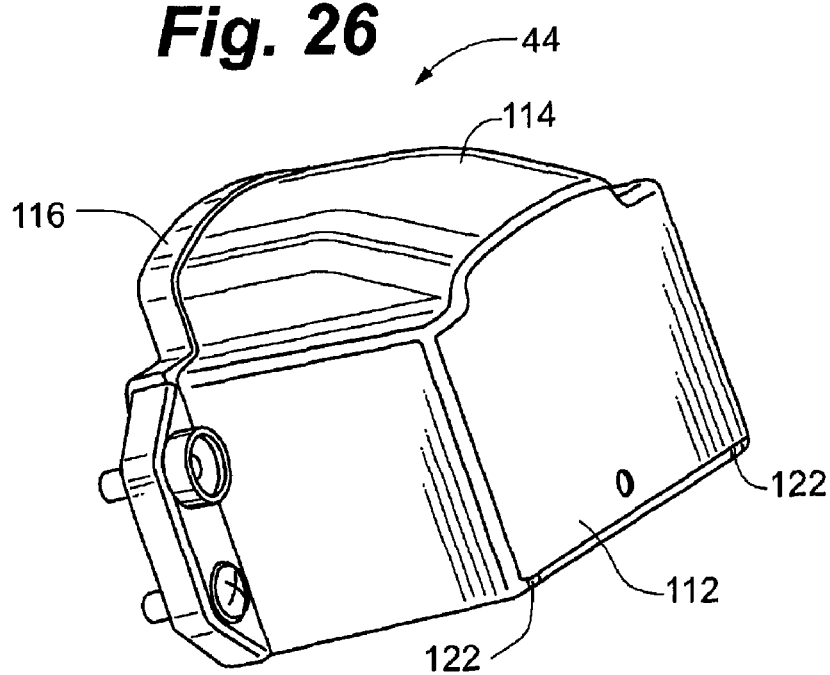
FIG. 26 is a perspective view of an automated meter reader module according to an embodiment of the present invention.
Figure 27:
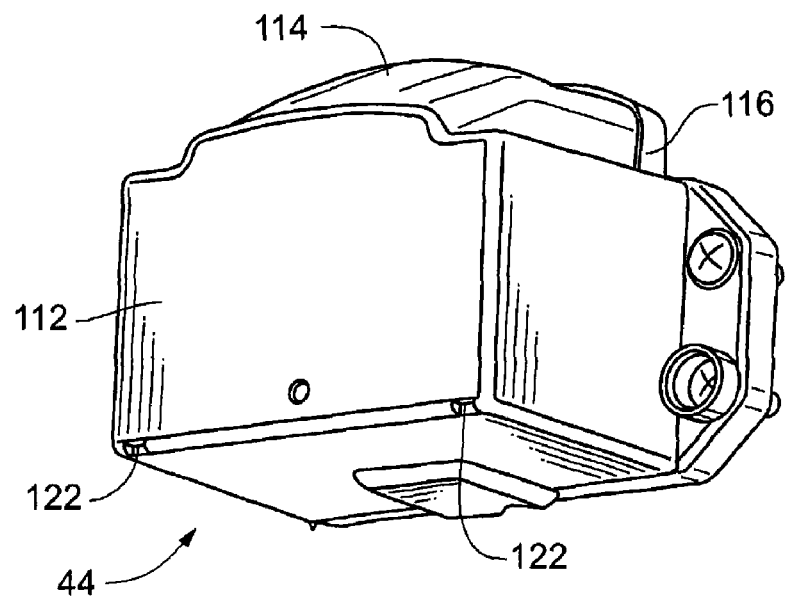
FIG. 27 is a perspective view of an automated meter reader module according to an embodiment of the present invention.

Cover 44 may be made from any number of materials. Generally, cover 44 is made of a transparent polymer. By making cover 44 from a transparent polymer, register dials 79 of index attachment 76 can be read without having to remove cover 44. Referring to FIGS. 26-27, cover 44 may have multiple viewing surfaces. Multiple viewing surfaces permit register dials 79 of index attachment 76 to be read from several vantage points. In an example embodiment, register dials 79 can be viewed through at least substantially planar front viewing surface 112 and substantially concave top viewing surface 114.

Figure 28:
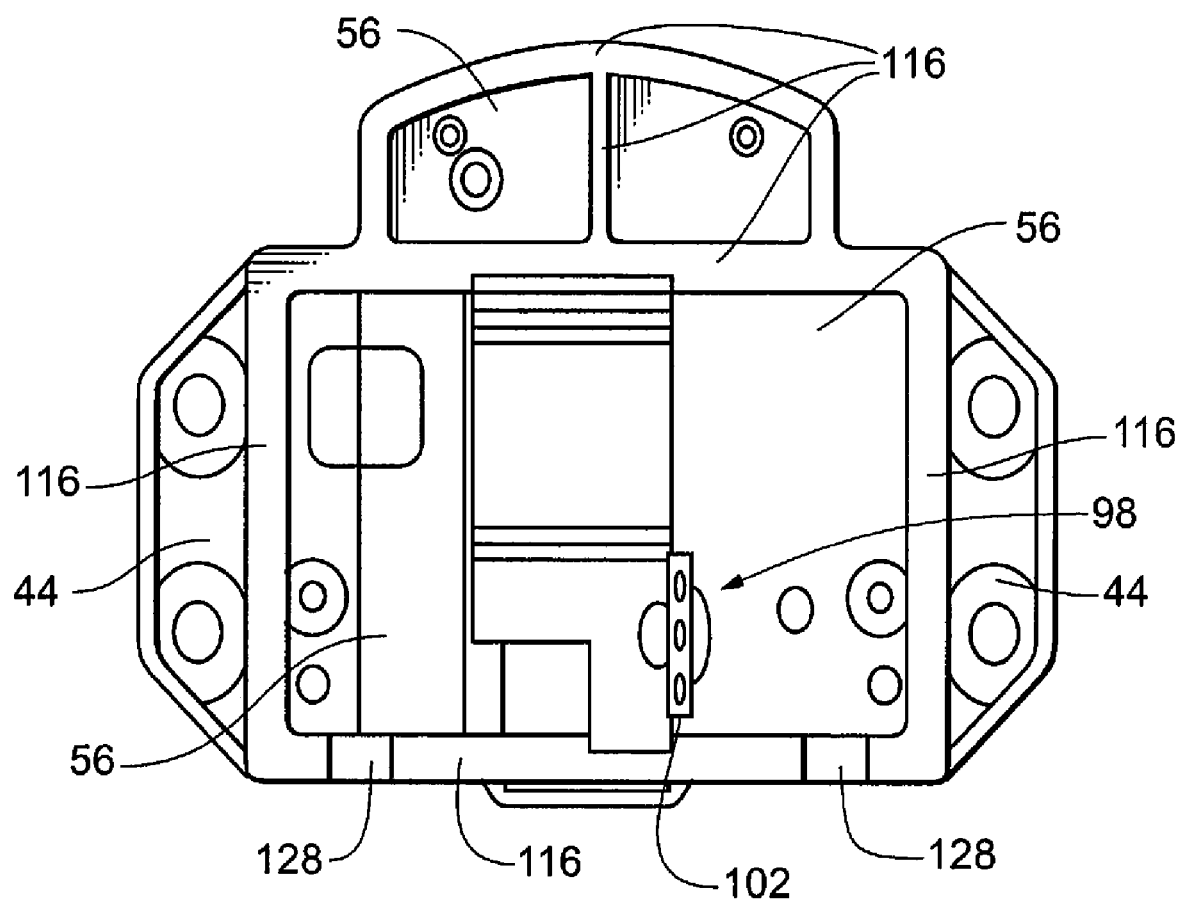
FIG. 28 is a read view of an automated meter reader module according to an embodiment of the present invention.

In conjunction with one embodiment of cover 44 and housing 42, gasket 116 also protects the internal components of automated meter reader module 40 from contamination or interference due to moisture, dust, insects, or other environmental debris. As depicted in FIG. 28, gasket 116 forms a seal around the perimeter of housing 42. When automated meter reader module 40 is mounted, gasket 116 substantially seals the interface of mounting structure 56 and housing 42 and the interface of cover 44 and housing 42.

As depicted in FIGS. 1-3 and 28, cover 44 has mounting apertures 118 through which mounting fastening members 110 can be inserted and fastened to mounting structure 50. In one embodiment, as depicted in FIGS. 1-2 and 28, mounting apertures 118 are located in outward-extending wings of cover 44. In accordance with this embodiment, mounting fastening members 110 do not penetrate housing 56 or gasket 116. In another embodiment, as depicted in FIG. 3, mounting apertures 118 are located in the corners of housing 56. In accordance with this embodiment, mounting fastening members 110 are also inserted through gasket 116. By tightening mounting fasteners 78, gasket 116 provides a compression fit that enhances the effectiveness of the enclosure formed by cover 44 and housing 42 in both of these embodiments. In other embodiments, gasket 116 may have a raised flange extending beyond the outer-most surface of cover 44. The extended flange can increase the effectiveness the seal between cover 44 to mounting structure 50.

Design features in automated meter reader module 40 can also provide a compression fit between housing 42 and cover 44. In an example embodiment, outer surfaces of walls 58 contact inner surface of cover 44. The inherent resiliency of the materials from which walls 58 and cover 44 are made causes housing 42 and cover 44 to come into forcible contact, thereby creating a compression fit.

In an example embodiment, gasket 116 is made of a Thermoplastic Elastomer (TPE) material, such as, for example, Thermoplastic Vulcanzite (TPV) such as Santoprene™ 211-55. As depicted in FIG. 28, a cork gasket 120 as utilized in the prior art can adhere to the surface of mounting structure 50, which requires additional time and effort to remove. Cork is also susceptible to deterioration, such as cracking, that can destroy the seal in the interface of mounting structure 50 and housing 42 and the interface of cover 44 and housing 42. Use of polymeric material for gasket 116 improves the durability of automated meter reader module 40 with respect to the use other materials, such as cork, previously used for gasket 116. In one embodiment utilizing the compression fit as described, the use of such a polymeric material for gasket 116 permits a releasable and resealable arrangement that facilitates maintenance of the AMR module and the meter itself without necessitating installation of a new sealing member. The use of a polymeric material for gasket 116 can also enhance the compression fit of cover 44 to housing 42 by frictionally securing cover 42 in place.

Automated meter reader module 40 may comprise several additional features that improve reliability, functionality, and durability of electronic components. In an example embodiment, housing cavity 60 is filled with a potting material. Potting material provides a substantially moisture-impermeable physical barrier between electronic components and environmental contaminants while not substantially adversely affect the performance of electronic components such as electronic circuitry 66 and battery 64.

Referring to FIG. 4, surface of cover 44 may be configured such bottom face 122 having lower outward-facing edges 124 of automated meter reader module does not form a right angle with respect to the plane of attachment area 52. Generally, lower-outward-facing edges 122 are oriented outwardly downward such that bottom face 122 is substantially planar and forms an angle with respect to the place of attachment area 52 in a range of about ninety-five degrees to slightly more than ninety degrees. In an example embodiment, bottom face 122 is substantially planar and forms an angle with respect to the place of attachment area 52 in a range of about ninety-one degrees to about ninety-two degrees.

Figure 29:
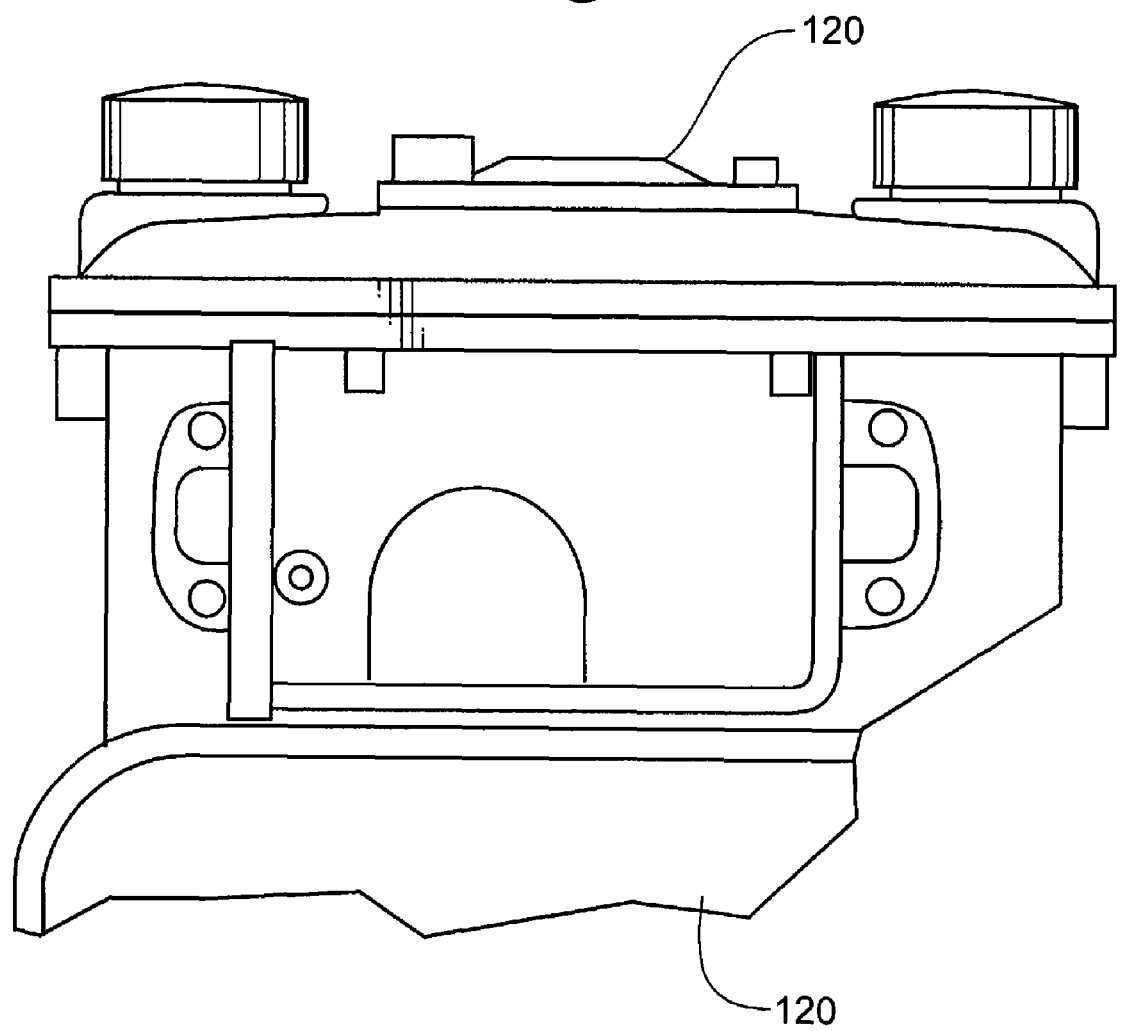
FIG. 29 is a front view of a utility meter reader.

Referring to FIG. 29, in one embodiment cover 44 may also be provided with structure defining drainage hole 126. If water enters automated meter reader module 40, such as through a crack in gasket 116, or condensation due to humidity builds up, water or accumulated condensation can exit automated meter reader module 40 into the outside environment by passing through drainage hole 126. The outwardly downward orientation of bottom face 122 of cover 44 of one embodiment can facilitate the formation of an exit path for water through drainage holes 126. Drainage holes 126 can be configured in any number of ways. In an example embodiment, drainage holes 126 are configured to form a small leak path at or near the edge where front surface 112 and bottom surface 122 are joined, such as depicted in FIGS. 2-3.

Generally, drainage holes 126 are large enough to prevent water tension from impeding the drainage of water or accumulated moister, but small enough to block or substantially deter invasion of automated meter reader module 40 by insects. Drainage holes 126 may be located in any portion of cover 44. In an example embodiment, drainage holes 126 are embedded in the portion of cover 44 in which bottom surface 122 transitions into front surface 112. In this embodiment, drainage holes 126 are also spaced apart such that each drainage hole 126 occupies a location at or near a side edge of front surface 112. In this manner, drainage holes minimize the amount of water or condensation that can build up within automated meter reader module in the event that bottom surface 122 of cover 44 is not level subsequent to installation.

Drainage hole 126 can be of any size and shape that permits the escape of water or accumulated condensation from automated meter reader module 40. In one embodiment, the dimensions and shapes of drainage hole 126 are configured such that insects, such as fire ants, are discouraged from attempting to access the interior of the AMR module 40. Referring to FIGS. 2-3, drainage hole 126 is substantially slit-like wherein a dimension of drainage hole 126 in one direction is substantially greater than a dimension in another direction. This tends configuration permits fluid substances, such as water, to exit through drainage hole 126 by conforming to the size and shape of the opening while limiting entry of rigid bodies to those conforming to the smallest dimension of drainage hole 126.

The location of drainage holes 126 in a portion of cover transitioning from bottom surface 122 into front surface 112 can minimize the size drainage holes 126 while maximizing proximity to bottom surface 122. The effectiveness of drainage holes 126 in discouraging the unintended entry of water and insects can also be enhanced through the addition of various structures on the inside surface of cover 44. Such structures are defined proximate drainage holes 126 to prevent a direct line of access into automated meter reader module 40 through drainage hole 126. These structures may comprise any number of configurations that inhibit access through drainage holes 126. In an example embodiment, the inside surface of front surface 112 has a ledge, approximately 1.2 mm×10.2 mm, located about 2.2 mm above drainage hole, approximately 0.5 mm×5 mm in size, to limit a direct penetration into the housing.

Gasket 116 may also have weeping holes 122 in the portion of gasket 116 interfacing with the side of housing 42 and mounting structure 50 of utility meter 48. Weeping holes 122 can channel water that may enter the space between automated meter reader module 40 and mounting structure 58, such as accumulated condensation or water that has entered this space through a crack in gasket 116.

The invention claimed is:

1. An automated meter reader module adapted to be installed on an existing utility meter having an index attachment that displays readings from the utility meter, the utility meter presenting an attachment area where the index attachment is selectively attachable to the utility meter, the automated meter reader module comprising:
a housing with a generally planar base having on a first side a plurality of walls defining an at least one housing cavity adapted to receive a printed circuit board having circuitry for the automated reader meter module, the housing including a structure on the first side adapted to interface with the index attachment and a portion of the base on a second side opposite the first side that is adapted to interface with the attachment area, the at least one housing cavity including a cavity portion that extends beyond a perimeter of the attachment area of the utility meter;
a cover locatable relative to the housing to cover both the housing cavity and the index attachment when the index attachment is mounted on the structure adapted to interface with the index attachment; and
a patch antenna integrated into the printed circuit board, the printed circuit board locatable within the at least one housing cavity such that the patch antenna occupies a position in the cavity portion that extends beyond the perimeter of the attachment area of the utility meter;
wherein the structure on the first side of the housing further comprises a first mounting post and a second mounting post designed to interface with the index attachment, the first mounting post and the second mounting post being located outside the at least one housing cavity.

2. The automated meter reader module of claim 1, wherein the utility meter monitors consumption of a utility selected from a group consisting of gas, water, and electricity.

3. The automated meter reader module of claim 1, wherein the housing is substantially filled with a potting material.

4. The automated meter reader module of claim 1, wherein the cover comprises a plurality of integrally joined faces.

5. The automated meter reader module of claim 4, wherein the index attachment has a plurality of register dials viewable through at least two of the integrally joined faces of the cover.

6. The automated meter reader module of claim 5, wherein the plurality of integrally joined faces comprises a first substantially planar face and a second substantially concave face, the planar and concave faces sharing an edge of the cover.

7. The automated meter reader module of claim 1, further comprising a flexible gasket having a first side adapted to sealingly interface with the cover and the first side of the base and a second side adapted to sealingly interface with the attachment area and the second side of the base, the flexible gasket being coextensively attached to a circumferential edge of the base.

8. The automated meter reader module of claim 1, wherein the printed circuit board has an at least one biasing member that secures the printed circuit board in the housing cavity, the biasing member having an elongated body with an annular resilient end distal to the printed circuit board.

* * * * *